POWER SUPPLY ARRANGEMENT FOR TELEVISION RECEIVERS

Filed Oct. 7, 1948 2 SHEETS—SHEET 1

Inventor
CHARLES E. TORSCH

By Killman and Kerst
Attorneys

Jan. 27, 1953 C. E. TORSCH 2,626,988

POWER SUPPLY ARRANGEMENT FOR TELEVISION RECEIVERS

Filed Oct. 7, 1948 2 SHEETS—SHEET 2

Inventor
CHARLES E. TORSCH

By Killman and Kerst
Attorneys

Patented Jan. 27, 1953 2,626,988

UNITED STATES PATENT OFFICE 2,626,988

POWER SUPPLY ARRANGEMENT FOR TELEVISION RECEIVERS

Charles E. Torsch, North Syracuse, N. Y., assignor to Bendix Aviation Corporation, Towson, Md., a corporation of Delaware Application October 7, 1948, Serial No. 53,261

9 Claims. (Cl. 178—5.81)

This invention relates to the economical utilization, in the various component circuits of a television receiver, of direct current power derived from the usual domestic power sources.

One of the unsatisfactory features attending the use of television receivers in the home has been the considerable amount of power consumed by the set. This has had the effect of noticeably increasing domestic bills for use of electric power. It has led in some instances to power rates discriminatory to owners of television receivers due to the increase in power plant operation costs caused by increased power consumption during the usual peak load periods.

Furthermore, the power consumed by a set affects the cost of the set since the power handling requirements of the components constitute a factor in their cost. The previous uneconomical consumption of power was due mainly to waste of power in bleeder resistances used for voltage dividing purposes. Such waste was accompanied by the evolution of heat which must be disposed of. This necessitated larger sized cabinets than would otherwise be required and the provision of unsightly ventilation holes. It also required that non-combustible insulation be provided for bleeder resistors.

It is an object of this invention to substantially eliminate the waste of power in television receivers and other electrical equipment due to the use of inert portions of the circuit for voltage dividing purposes.

It is a further object to utilize, for voltage dividing purposes in television receivers and other electrical equipment, portions of the circuit which as their primary function operate upon the current flow in ways other than by the provision of voltage dropping resistance.

It is another object of the invention to provide, in a television receiver or other electrical equipment, a voltage divider for the distribution of power to the various components of the circuit which utilizes the space discharge paths of said circuit components.

Figure 1:
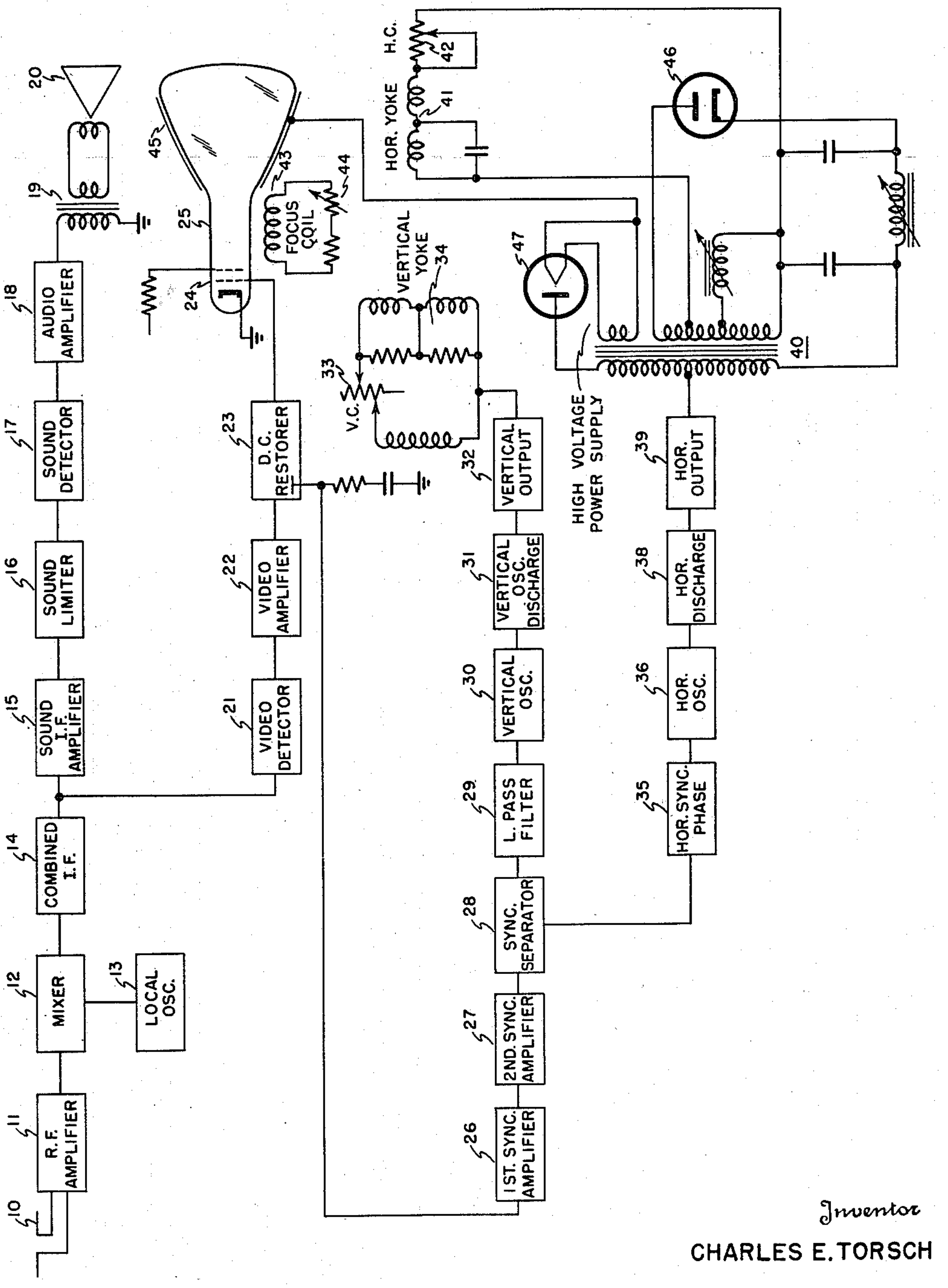
Figure 2:
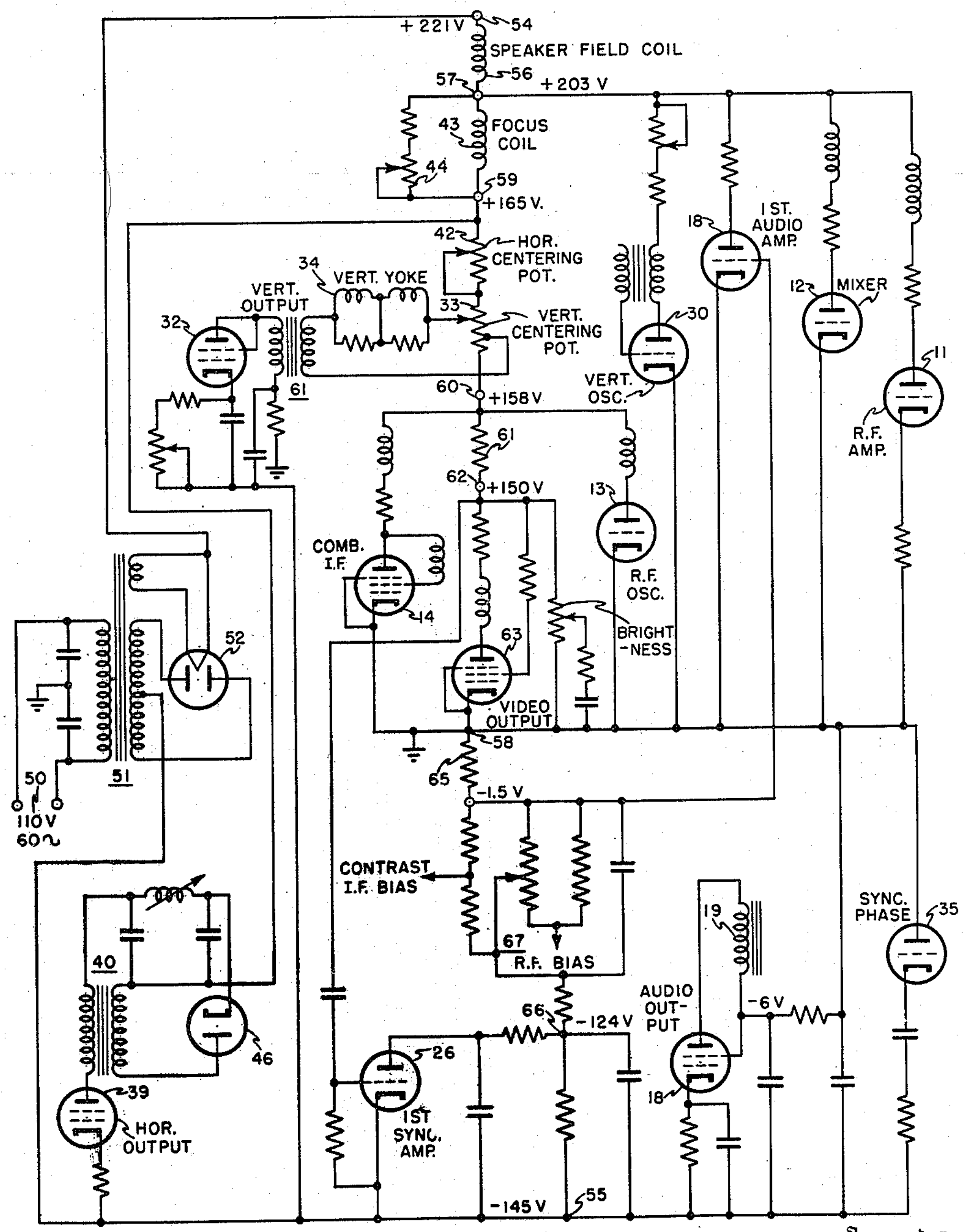

Other objects and advantages of the invention will be apparent from a consideration of the following description and the accompanying drawing in which:

Fig. 1 is a block schematic diagram of a television receiver circuit in which the invention may be employed, and Fig. 2 is a schematic diagram of a power supply circuit embodying the invention.

Referring more particularly to the drawing, the circuit shown in Fig. 1 is that of a typical television receiver in which the sound and picture carriers are intercepted by antenna 10, amplified in amplifier 11, and heterodyned in mixer 12 with a frequency generated by the R. F. oscillator 13 to intermediate frequencies which are impressed on a single I. F. channel 14.

At 15 the sound carrier is separated and amplified and is subject to limiting at 16. The sound is detected and amplified at 17 and 18 respectively and the output is coupled by a transformer 19 to the voice coil of a speaker 20.

The video signal is detected at 21, amplified at 22 and the D. C. component is restored at 23. The resulting signal is then applied to control grid 24 of the picture tube 25.

The synchronizing signals are taken off at the D. C. restorer, amplified in the first and second sync. amplifiers 26 and 27, and separated into vertical and horizontal components in the separator 28.

The vertical synchronizing signals are put through low pass filter 29 and applied as synchronizing voltage to the vertical blocking oscillator 30. The output of this oscillator is shaped into the desired saw-tooth form in the vertical oscillator discharge 31. This wave form is applied to the vertical yoke 34 by the vertical output circuit 32. A centering potentiometer 33 is connected to the yoke.

The horizontal synchronizing signals are first applied, after separation, to a phase adjusting circuit 35 and thence as synchronizing voltage to a blocking oscillator 36. The output of this oscillator is applied to a saw-tooth wave shaping circuit 38 and thence to an output circuit 39 which applies the signal to the primary of a transformer 40. The horizontal deflection yoke 41 is connected across the secondary of the transformer. It is provided with a centering potentiometer 42.

A focus coil 43 shunted by a focus adjusting potentiometer 44 is provided for the picture tube 25.

High voltage for the second anode 45 of the picture tube is provided by the kick-back method from the fly-back portion of the horizontal deflection voltage wave. This method utilizes the oscillation of the network associated with the transformer 40 which oscillation is damped by a damper tube 46 after the first negative half cycle. A high voltage pulse is set up in the primary of the transformer by induction. The primary is connected as an auto transformer and the high voltage pulses thus obtained from the primary are rectified by the tube 47 and supplied to the second anode 45 of the picture tube.

The high voltage supply is not related to the instant invention except by a common utilization of elements. Most television sets are provided with two voltage supply sources, the one just described and a low voltage supply source for the provision of supply voltage to the components of the set other than the picture tube. It is this latter source to which the invention is directed. The transformer 40 is utilized, however, as a means for coupling supply voltage to the horizontal output circuit.

Previous practice with respect to the provision of a low voltage supply has been to subject the 110 v. alternating current from domestic supplly mains to the usual rectification and filtering and to apply the output across a voltage dividing potentiometer from which, at appropriate points, the various levels of supply voltage were tapped. The waste of power in this divider was the source of the adverse effects spoken of above.

A low voltage power supply system embodying the invention and applicable to the receiver of Fig. 1 is shown in Fig. 2. In this figure, portions of the component circuits from the blocks of Fig. 1 have been shown and have been given the reference characters identifying the corresponding circuit blocks in Fig. 1 although the entire circuits which would be encompassed by the blocks are not shown in Fig. 2.

The low voltage supply is derived from the usual 110 v. terminals shown at 50. It is stepped up in transformer 51, rectified in rectifier 52, and applied to the terminals 54 and 55 at a value of 366 volts. The voltage divider connected across these terminals is grounded at an intermediate point 58, providing two voltage legs with the terminal 54 at a value of +221 v. and terminal 55 at a value of −145 v. It should be understood that these voltage values and the intermediate values to be later referred to are given purely for purposes of illustration and example and are dependent in practice entirely on the design of the particular set being considered.

In accordance with the instant invention the voltage divider connected across the terminals 54 and 55 is composed substantially entirely of space discharge paths of the various circuit components of the set and of other circuit elements which have an active role in the functioning of the set other than providing dropping resistance.

Connected to the terminal 54 is the speaker field coil 56 which drops the voltage to +203 v. at its remaining terminal 57.

Connected between the terminal 57 and the ground terminal 58 of the divider is a parallel arrangement of the space current paths of various tubes of the set. These consist of the tubes of the vertical oscillator 30, the first audio amplifier 18, the R. F. mixer 12, and the R. F. amplifier 11.

Continuing the positive leg of the divider is the focus coil 43 connected to the terminal 57 and reducing the voltage to +165 v. at its remaining terminal 59. Connected between the terminal 59 and the terminal 55 of the negative leg is the tube of the horizontal output 39. The plate supply voltage for this tube is coupled thereto by way of the transformer 40.

To terminal 59 are serially connected the horizontal and vertical centering potentiometers 42 and 33 which together provide a voltage reduction to +158 v. at the free terminal 60 of potentiometer 33. Plate supply voltage is applied to vertical output tube 32 from a tap on the vertical centering potentiometer 33, by way of the vertical yoke 34 and a transformer 61. The cathode of tube 32 is connected to the negative terminal 55.

Between the terminal 60 and the ground terminal 58 are connected the space current paths of the combined I. F., represented by the tube 14, and the R. F. oscillator represented by the tube 13.

A small dropping resistor 61 connected to terminal 60 reduces the voltage to +150 v. at terminal 62. Between this point and ground, voltage is supplied to video output tube 63 and to brightness potentiometer 64. The potential of terminal 62 is also applied to the grid of the first sync. amplifier, denoted by tube 26.

Between the ground terminal and negative terminal 55 voltage is supplied to sync. phase tube 35 and the audio output circuit shown as tube 18.

Below the ground terminal 58 a small dropping resistor 65 provides a terminal 66 with a potential of −1.5 v. This voltage is applied to the control grid of the first audio amplifier 18. Across this terminal and terminal 66 a biasing network 67 reduces the voltage to −124 v. at the latter point. This network provides contrast or I. F. bias and R. F. bias.

Between terminals 66 and 55 voltage is supplied to the first sync. amplifier represented by tube 26.

From the above description it can be seen that substantially the entire division of voltage to the various levels needed in the set is supplied by elements which are otherwise active in the set, rather than by inert, power consuming resistors as in prior practice. This results in greatly reducing the powe consumed by the set with outstanding benefits in lowered cost of components and cabinet, possibilities of more beautiful cabinet design, reduction of shock hazard, lessened production of heat and lowered cost of set operation.

What is claimed is:

1. A power supply arrangement for a television receiver comprising means generating a power supply potential and a voltage dividing means to which said potential is applied for conversion to the various voltage levels required by said receiver, said voltage dividing means consisting substantially entirely of circuit components through which the passage of current operates upon some portion of the received signal as a step in its transformation into the final output of the receiver.

2. A power supply arrangement for a television receiver comprising means generating a power supply potential and a voltage dividing means to which said potential is applied for conversion to the various voltage levels required by said receiver, said voltage dividing means consisting substantially entirely of serially connected circuit components through which the passage of current operates upon some portion of the received signal as a step in its transformation into the final output of the receiver.

3. A power supply arrangement for a television receiver comprising means generating a power supply potential and a voltage dividing means to which said potential is applied for conversion to the various voltage levels required by said receivers, said voltage dividing means consisting substantially entirely of serially connected circuit components through which the passage of current operates upon some portion of the received signal as a step in its transformation into the final output of the receiver, said components including the space discharge paths of electron discharge tubes.

4. A power supply arrangement for a television receiver comprising means generating a power supply potential and a voltage dividing means to which said potential is applied for conversion to the various voltage levels required by said receiver, said voltage dividing means comprising serially connected space discharge paths of electron discharge tubes of said receiver, said discharge tubes operating upon the received signal during its transformation into the final output of the receiver.

5. A power supply arrangement for a television receiver comprising means generating a power supply potential and a voltage dividing means to which said potential is applied for conversion to the various voltage levels required by said receiver, said voltage dividing means comprising serially connected space discharge paths of electron discharge tubes of said receivers, said voltage dividing means being grounded at an intermediate point thereof, and said discharge tubes being tubes which act on some portion of the received signal during its transformation into the final output of the receiver.

6. A power supply arrangement for a television receiver comprising means generating a power supply potential and a voltage dividing means to which said potential is applied for conversion to the various voltage levels required by said receiver, said voltage dividing means being grounded at an intermediate point and thus being divided into a positive and a negative leg, said voltage dividing means consisting substantially entirely of serially connected circuit components through which the passage of current operates upon some portion of the received signal as a step in its transformation into the final output of the receiver, said components in both legs of said divider including space discharge paths of electron discharge tubes.

7. A power supply arrangement for a television receiver having a cathode ray tube, a coil for focusing the electron stream of said tube, and a circuit for generating horizontal deflection voltage for said tube, the last named circuit having an output circuit including an electron discharge tube: said arrangement comprising means generating a power supply potential and a voltage dividing means to which said potential is applied for conversion to the various voltage levels required by said receiver, said voltage dividing means consisting substantially entirely of serially connected circuit components through which the passage of current operates upon some portion of the received signal as a step in its transformation into the final output of the receiver, said component including said focus coil and the space discharge path of said electron discharge tube of said horizontal deflection output circuit.

8. A power supply arrangement for a television receiver comprising means generating a power supply potential and a voltage dividing means to which said potential is applied for conversion to the various voltage levels required by said receiver, said voltage dividing means being grounded at an intermediate point and thus being divided into a positive and a negative leg, an audio output circuit in said receiver, said voltage dividing means consisting substantially entirely of serially connected circuit components through which the passage of current operates upon some portion of the received signal as a step in its transformation into the final output of the receiver, said components in said negative leg including the space discharge path of said audio output circuit.

9. A power supply arrangement for a television receiver having a cathode ray tube, a coil for focusing the electron stream of said tube, an audio output circuit including an electron tube, and a circuit for generating horizontal deflection voltage for said tube, the last named circuit having an output circuit including an electron discharge tube; said arrangement comprising means generating a power supply potential and a voltage dividing means to which said potential is applied for conversion to the various voltage levels required by said receiver, said voltage dividing means consisting substantially entirely of serially connected components through which the passage of current operates upon some portion of the received signal as a step in its transformation into the final output of the receiver, said voltage dividing means being grounded at an intermediate point and thus being divided into a positive and a negative leg, said components including said focusing coil, and the space discharge paths of said electron discharge tubes, said focus coil being connected in the positive leg of said dividing means, the space discharge path of the electron discharge tube of said horizontal deflection output circuit being connected across said negative leg and a portion of said positive leg and the space discharge path of said audio output circuit being connected in said negative leg.

CHARLES E. TORSCH.

REFERENCES CITED

The following references are of record in the file of this patent:

UNITED STATES PATENTS

| Number | Name | Date |
|---|---|---|
| 2,253,864 | Muller | Aug. 26, 1941 |
| 2,355,191 | Vance | Aug. 8, 1944 |
| 2,369,631 | Zanarini | Feb. 13, 1945 |
| 2,430,331 | Galella et al. | Nov. 4, 1947 |
| 2,465,406 | Taylor | Mar. 29, 1949 |